(No Model.)
J. P. ZEIHER.
BUCKET TOP.
No. 587,140. Patented July 27, 1897.
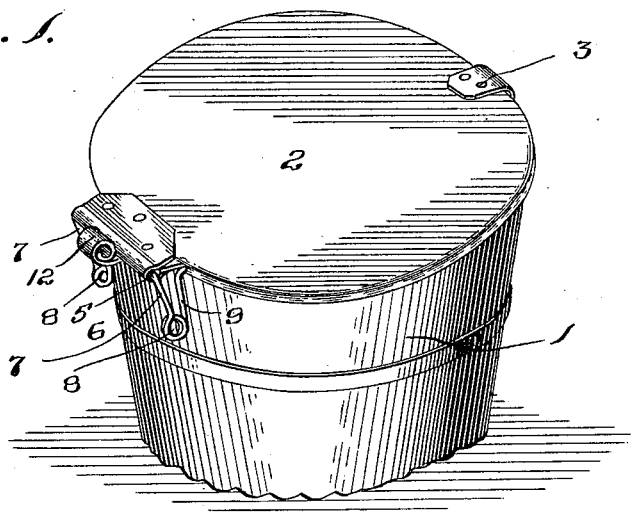
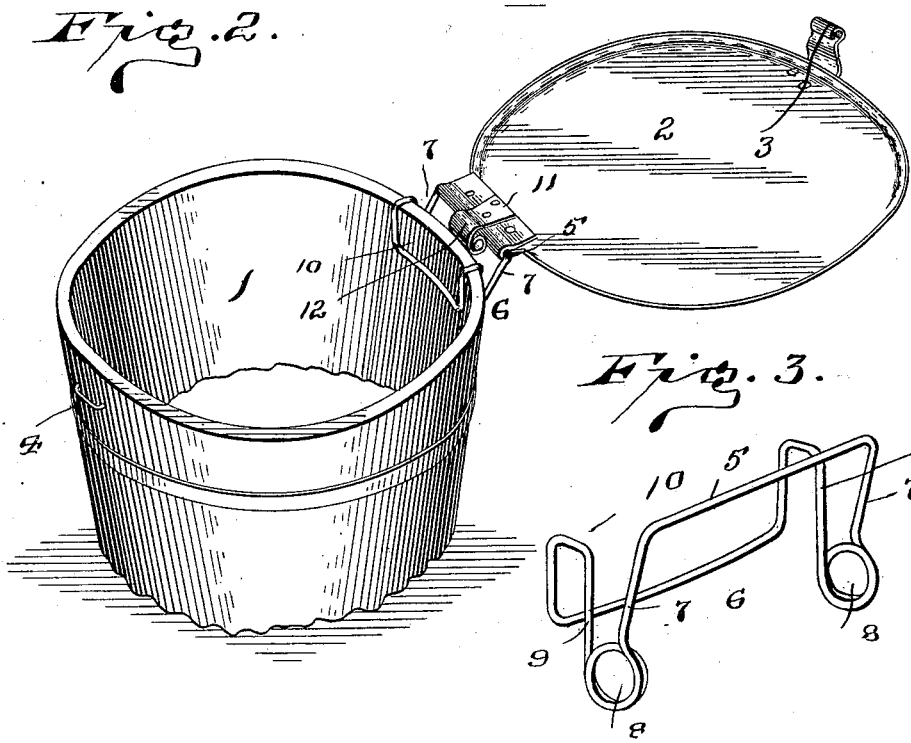
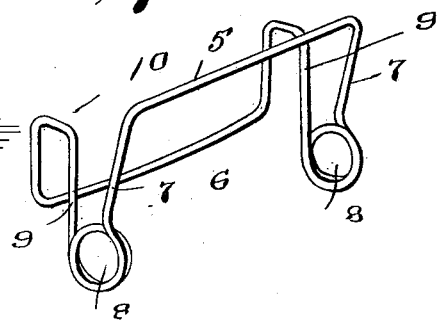
WITNESSES
INVENTOR
John P. Zeiher
by John Wedderburn
Attorney

UNITED STATES PATENT OFFICE.

JOHN P. ZEIHER, OF MALDEN, WEST VIRGINIA.

BUCKET-TOP.

SPECIFICATION forming part of Letters Patent No. 587,140, dated July 27, 1897.

Application filed November 6, 1896. Serial No. 611,292. (No model.)

*To all whom it may concern:*

Be it known that I, JOHN P. ZEIHER, a citizen of the United States, residing at Malden, in the county of Kanawha and State of West Virginia, have invented certain new and useful Improvements in Bucket-Tops; and I do hereby declare the following to be a full, clear, and exact description of the invention, such as will enable others skilled in the art to which it appertains to make and use the same.

My invention relates to improvements in buckets, the invention residing particularly in a lid or cover therefor which may be readily attached to or detached from a bucket, pail, or other similar vessel.

The invention consists of the construction, combination, and arrangement of parts, all as hereinafter more fully described and claimed.

In the drawings forming part of this specification, Figure 1 represents a perspective view of a bucket having my improved lid applied thereto, the same being shown in its closed position. Fig. 2 is a similar view of the same with the lid shown in its open position. Fig. 3 is a detail view of the clip to which said lid is hinged.

Like reference-numerals indicate like parts in the different views.

The bucket 1 may be of any suitable form and construction, and the lid 2 is adapted to be applied thereto so that it may be readily removed when desired. Said lid is made of a disk of sheet metal having a spring fastening device 3 at one edge, which is adapted to project down and engage a pin or bar 4 on the side of the bucket, and said lid is pivoted to a cross-bar 5 on the spring-clip 6. The said clip 6 is made of a single strip of wire formed with two substantially parallel arms 7 7, with loops or coils 8 8 at their lower ends, with arms 9 9 extending upwardly from said loops or coils, and an inwardly-extending portion 10, which is adapted to be passed around the upper edge of the side of the bucket 1. Projecting outwardly from the edge of the lid or cover 2, adjacent to its point of connection with the clip 6, is a plate 11, which is bent rearwardly into a loop 12, as clearly shown, which plate forms a stop for preventing the rearward movement of the lid when the same comes into contact with the outer surface of the side of the bucket 1.

As thus constructed it will be seen that the clip 6 may be applied to the bucket, pail, crock, or other suitable vessel and may be as readily removed therefrom when desired. The device is extremely simple in construction, can be cheaply made, and can be attached to any pail or bucket now in use.

Having now described my invention, what I claim as new, and desire to secure by Letters Patent, is—

The combination with a bucket or other similar vessel, of a spring-clip adapted to be applied to and removed from the upper side of said bucket, the said clip being made of a single strip of wire formed with a looped portion adapted to engage the upper side of said bucket or other vessel, with downwardly-extending arms on each side, loops or coils at the lower ends of the outer of said arms, upwardly-extending arms leading from said loops or coils, and a cross-bar connecting the latter pair of arms, a lid or cover pivoted to said cross-bar, and a plate projecting outwardly from said lid or cover adapted to engage the outer surface of said bucket and constituting a stop for limiting the outward movement of said lid or cover, substantially as described.

In testimony whereof I have signed this specification in the presence of two subscribing witnesses.

JOHN P. ZEIHER.

Witnesses:
 JOEL S. QUARRIER, Sr.,
 V. S. BLACK.